US011838284B2

(12) United States Patent
Burson

(10) Patent No.: US 11,838,284 B2
(45) Date of Patent: Dec. 5, 2023

(54) CROSS-DOMAIN PROOF-OF-POSSESSION

(71) Applicant: T-Mobile USA, Inc., Bellevue, WA (US)

(72) Inventor: Kendrick Burson, Kirkland, WA (US)

(73) Assignee: T-Mobile USA, Inc., Bellevue, WA (US)

(*) Notice: Subject to any disclaimer, the term of this patent is extended or adjusted under 35 U.S.C. 154(b) by 105 days.

(21) Appl. No.: 17/165,516

(22) Filed: Feb. 2, 2021

(65) Prior Publication Data
US 2021/0243177 A1 Aug. 5, 2021

Related U.S. Application Data

(60) Provisional application No. 62/969,525, filed on Feb. 3, 2020.

(51) Int. Cl.
*H04L 9/40* (2022.01)
*H04L 67/02* (2022.01)

(52) U.S. Cl.
CPC ...... *H04L 63/0807* (2013.01); *H04L 63/0815* (2013.01); *H04L 67/02* (2013.01)

(58) Field of Classification Search
CPC . H04L 63/0807; H04L 63/0815; H04L 67/02; H04W 12/06
See application file for complete search history.

(56) References Cited

U.S. PATENT DOCUMENTS

| 10,341,410 B2 | 7/2019 | Lander et al. |
| 10,505,916 B2 | 12/2019 | Engan et al. |
| 2005/0204148 A1* | 9/2005 | Mayo ............... H04L 63/0815 713/172 |
| 2012/0257751 A1* | 10/2012 | Everett ............. H04L 9/0897 380/255 |
| 2015/0237041 A1* | 8/2015 | Flamini ............ H04L 63/0823 726/10 |
| 2018/0012012 A1* | 1/2018 | Stone .................... G06F 21/41 |
| 2018/0137199 A1* | 5/2018 | Miller ................ G06F 16/951 |
| 2019/0124070 A1* | 4/2019 | Engan ................ H04L 9/3234 |

* cited by examiner

Primary Examiner — Henry Tsang

(57) ABSTRACT

This disclosure describes techniques for implementing a Single-sign-On Domain-Agnostic Proof-of-Possession (SODA-POP) token (or access token) to solve generation of multiple POPs for authentication of multiple domains that may belong to a single mobile network operator (MNO). The access token may be implemented by a JSON Web Token (JWT) that includes a map of key-value pairs as confirmation claims. The key-value pairs may include multiple domains/sub-domains and their corresponding public keys. These key-value pairs may be registered and added in the confirmation claims to automatically authenticate each one of the domains to access a corresponding service provider. To register a new domain, the new domain redirects a request back to an already registered domain, which updates the access token and then redirects the request back to the new domain. After registration, the updated access token may be used to access services at all registered domains without further reauthentication.

20 Claims, 9 Drawing Sheets

CROSS-DOMAIN PROOF-OF-POSSESSION

PRIORITY APPLICATION

This application claims the benefit of and priority to U.S. Provisional Application No. 62/969,525, filed Feb. 3, 2020, the entire contents of which are incorporated herein by reference.

BACKGROUND

It has become common practice to use tokens to authenticate a user requesting access to a web application or Application Programming Interface (API). Existing standards define how an entity, such as the web application, may authorize an identity of an end-user based on an authentication performed by a third-party secure authentication service. A common standard in use today is a JSON Web Token (JWT). The JWT is an Internet standard that has been gaining popularity due to its compact design and usability in hypertext transfer protocol (HTTP) client-server communications. However, clients have to store and transmit tokens, which means that tokens are susceptible to being stolen and presented to illegitimately gain authorized access to a secure system.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
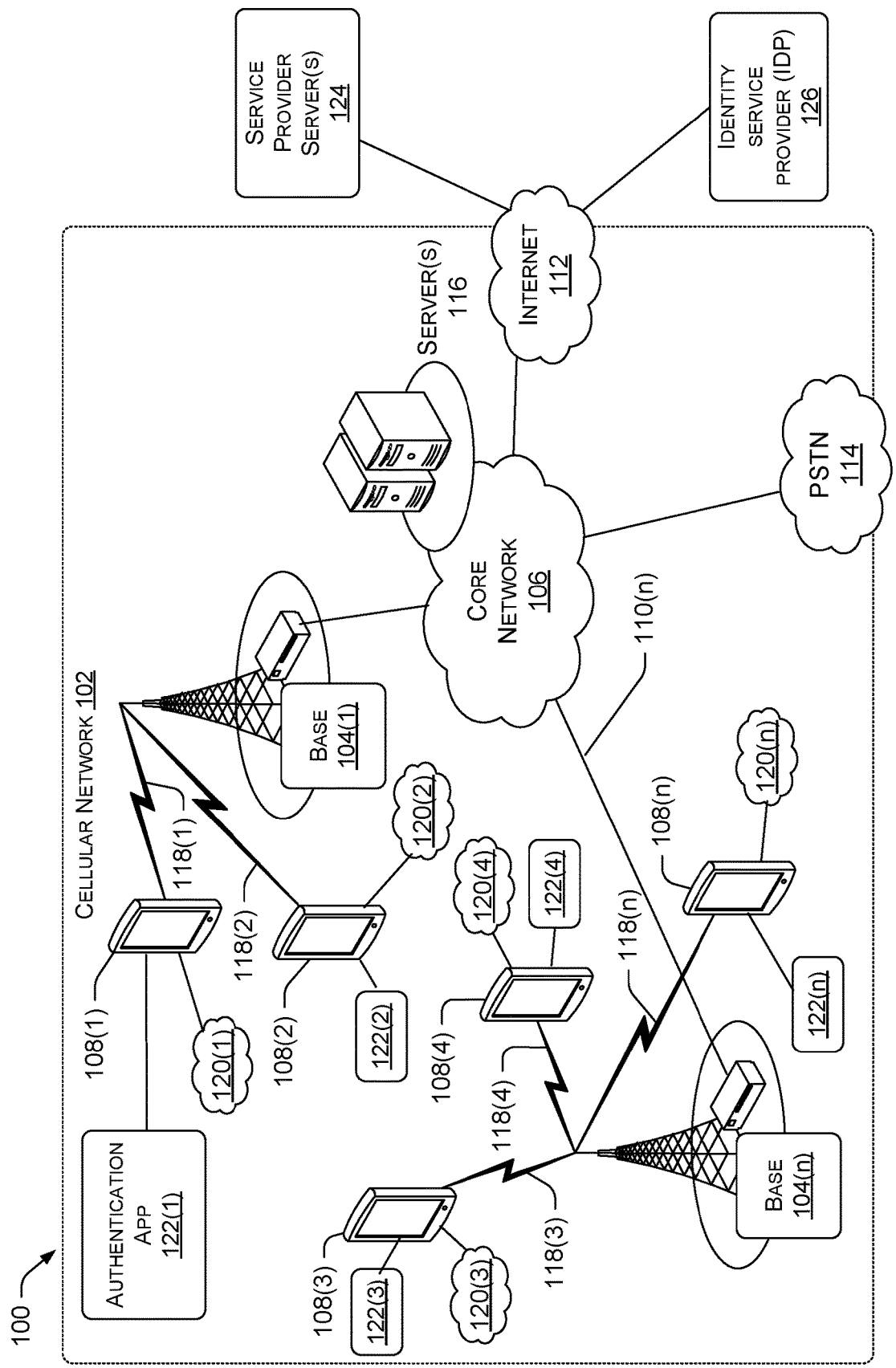
FIG. 1 illustrates an example network architecture for implementing use of a Single-sign-On Domain-Agnostic Proof-of-Possession (SODA-POP) token, in accordance with at least one embodiment.

This disclosure is directed to techniques for using a Single-sign-On Domain-Agnostic Proof-of-Possession (SODA-POP) token to improve user experience during cross-domain operations. The SODA-POP token (which is an example of an access token) may include a token that can be used to authenticate users that may seek access to websites via a web browser. In an example embodiment, the access token may be implemented with a JSON Web Token (JWT) that contains a map of key-value pairs in its payload confirmation claim. The payload confirmation claim may include a part of the JWT that can be used to confirm proof-of-possession. Each key-value pair in the map of key-value pairs may correspond to a domain (or subdomain) that may be authorized to use the access token. When an unregistered domain sends an access request for a service (e.g., unregistered with the SODA-POP token), the key-value pair that may be associated with the unregistered domain may first be added to the map of key-value pairs before access can be granted through the use of the access token. Further, a nonce token may be used to POP sign the access request. As described herein, the nonce token may include may have a self-contained identity mechanism for authentication and authorization and signed by a web browser to POP sign an entire request. Further, a key-value pair may include a key identification (key ID) and a hash of a JSON Web Key (JWK) of the domain. The key ID may be provided by a crypto library when a crypto pair is generated in the browser while the value may include 256 Secure Hash Algorithm (256sha) of the JWK.

For security and privacy reasons, web browsers may associate an independent security domain with each internet domain. For example, different security domains may be associated with "www.website.com" and "my.website.com". Each security domain may be associated with one or more cryptographic keys (e.g., an asymmetric key pair) and an independent browser-side data storage facility (e.g., cookie storage, local storage, IndexedDB, cache). The cryptographic keys may be stored in a non-serializable form (e.g., in IndexedDB) to inhibit serialization and transmission of private keys. A web browser may limit access to cryptographic keys to operations of the associated security domain. Following an initial authentication, the browser-side data storage e.g., cookie storage, may be used to store a cryptographic authentication token. In an example implementation, operations associated with a registered domain may have access to the associated security domain and cryptographic keys. Accordingly, such operations may facilitate the adding of unregistered key-value pairs to the map of key-value pairs of the SODA-POP token. For example, the web browser may send an access request associated with a new domain to a service hosted by a backend server. In this example, a generated nonce token may sign the access request. The backend server may receive the key-value pair that may be associated with the new domain and search the map of key-value pairs for matching public key-value pair. Given a situation where the associated key-value pair of the new domain is not found in the map, then the access request may be redirected to a registered domain that has access to an existing authentication token for a user. The redirection may cause the web browser to facilitate the adding of the key-value pair of the new domain to the map of key-value pairs in the SODA-POP token. With this registration, the backend server may grant access to the new domain through the use of the updated access token and without further authentication as the user switches between registered domains during the session. Although a web browser (e.g., an HTTP client) interacting with a web server (e.g., an HTTP server) is used throughout this description as an illustrative example, one of skill in the art will recognize that any suitable client and server components may utilize these techniques.

The novel techniques presented herein are described in more detail, below, with respect to several figures that identify elements and operations used in systems, devices, methods, computer-readable storage media, etc. that implement the techniques.

Example Architecture

FIG. 1 illustrates an example network architecture 100 for implementing the use of a domain agnostic access token to improve the user experience when accessing different domains (or web applications) that may belong to a single entity such as a mobile network operator (MNO). Different domains may be associated with a different set of cryptographic keys (e.g., private and public keys) and can be associated with different access tokens. For domains that may belong to a single MNO, toggling or using of multiple access tokens may be frustrating to a user and potentially insecure. In this regard, a web browser may implement a domain agnostic access token to avoid the toggling or use of multiple access tokens for cross-domain operations. In one example, the domain agnostic access token may include a JWT having an index of registered domains that may be automatically authenticated to access corresponding service providers. To register a new (unregistered) domain in the JWT, an access request from the new domain may be redirected to an already registered domain, which may request an addition of the new domain and update the access token. After registration, the registered new domain may obtain access to the services without further reauthentication.

As described herein, the domain agnostic access token may include a map of key-value pairs in a confirmation claim of its JWT payload. Each key-value pair in the map of key-value pairs may correspond to a domain in a plurality of domains (e.g., local.com, sub.local.com) that may belong to a single entity (e.g., single MNO). In one example, a key-value pair may include a key ID and a hash of a JWK (or public key) of a particular domain. In this regard, adding a new key-value pair corresponding to an unregistered new domain may include registering this new domain in the map of key-value pairs. The registration may indicate that the new domain may include authorized use of the domain agnostic access token.

The network architecture 100 as shown may include a cellular network system, however, it is noted that in one or more implementations, the present techniques can be applied to a network architecture that may not include cellular components.

The network architecture 100 may include a carrier network 102 that may be provided by a wireless telecommunication carrier. The carrier network 102 includes cellular network base stations 104(1)-104(n) and a core network 106. Although only two base stations are shown in this example, the carrier network 102 may include any number of base stations. The carrier network 102 provides telecommunication and data communication in accordance with one or more technical standards, such as Enhanced Data Rates for GSM Evolution (EDGE), Wideband Code Division Multiple Access (W-CDMA), HSPA, LTE, LTE-Advanced, CDMA-2000 (Code Division Multiple Access 2000), and/or so forth.

The base stations 104(1)-104(n) may be responsible for handling voice and data traffic between user devices, such as user devices 108(1)-108(n), and the core network 106. Each of the base stations 104(1)-104(n) may be communicatively connected to the core network 106 via a corresponding backhaul 110(1)-110(n). Each of the backhauls 110(1)-110(n) may be implemented using copper cables, fiber optic cables, microwave radio transceivers, and/or the like.

The core network 106 may also provide telecommunication and data communication services to the user devices 108(1)-108(n). In the present example, the core network may connect the user devices 108(1)-108(n) to other telecommunication and data communication networks, such as the Internet 112 and public switched telephone network (PSTN) 114. The core network 106 may include one or more servers 116 that implement network components. For example, the network components may include a serving GPRS support node (SGSN) that routes voice calls to and from the PSTN 114, a Gateway GPRS Support Node (GGSN) that handles the routing of data communication between external packet-switched networks and the core network 106. The network components may further include a Packet Data Network (PDN) gateway (PGW) that routes data traffic between the GGSN and the Internet 112.

Each of the user devices 108(1)-108(n) may include an electronic communication device, including but not limited to, a smartphone, a tablet computer, an embedded computer system, etc. Any electronic device that is capable of using the wireless communication services that are provided by the carrier network 102 may be communicatively linked to the carrier network 102. For example, a user may use a user device 108 to make voice calls, send and receive text messages, and/or download content from the Internet 112. A user device 108 is communicatively connected to the core network 106 via a base station 104. Accordingly, communication traffic between user device 108(1)-108(n) and the core network 106 may be handled by wireless interfaces 118(1)-118(n) that connect the user devices 108(1)-108(n) to the base stations 104(1)-104(n).

Each of the user devices 108(1)-108(n) may be capable of connecting to a network, including the Internet, via a wireless network connection other than the carrier network wireless services. As shown, device 108(1) may include a connection to network 120(1), device 108(2) includes a connection to network 120(2), device 108(3) includes a connection to network 120(3), device 108(4) includes a connection to network 120(4), and user device 108(n) includes a connection to network 120(n). The wireless connections are made by way of any method known in the art, such as Bluetooth®, WiFi, Mesh, or wired connections.

In one example, each of the user devices 108(1)-108(n) may store authentication apps 122(1)-122(n), respectively. The authentication app 122 may include a program that implements the domain agnostic access token for automatic authentication of registered domains during cross-domain operations. In an example embodiment, the domain agnostic access token may be implemented by a JWT that includes a payload with a map of key-value pairs as confirmation claims. The key-value pairs may include multiple domains/sub-domains and their corresponding hashed public keys (e.g., JWK). These key-value pairs may be registered and added in the domain agnostic access token to automatically authenticate each one of these domains to access a corresponding service provider in one or more service providers 124.

To add a new domain in the map of key-value pairs in the domain agnostic access token, an access request from the new domain may be redirected to an already registered domain. The already registered domain, which may include access to the private and public keys of a client storage, may request the registration of the new domain (e.g., the addition of corresponding key-pair value). Since the request is coming from the already registered domain that has access to the private keys of the hosting user device, then a man-in-the-middle "replay" attack may be avoided in the process. The authentication application 122 in the user device 108 is described in greater detail, below, with respect to subsequent figures.

Apart from the cellular network 102, FIG. 1 may include an identity service provider (IDP) 126 that may include a server that supports the implementation of the domain agnostic access token as described herein. The IDP 126 is further described, below, with respect to an interaction between the user device 108, server 124, and IDP 126.

Example Client-Server-IDP Interaction

Figure 2:
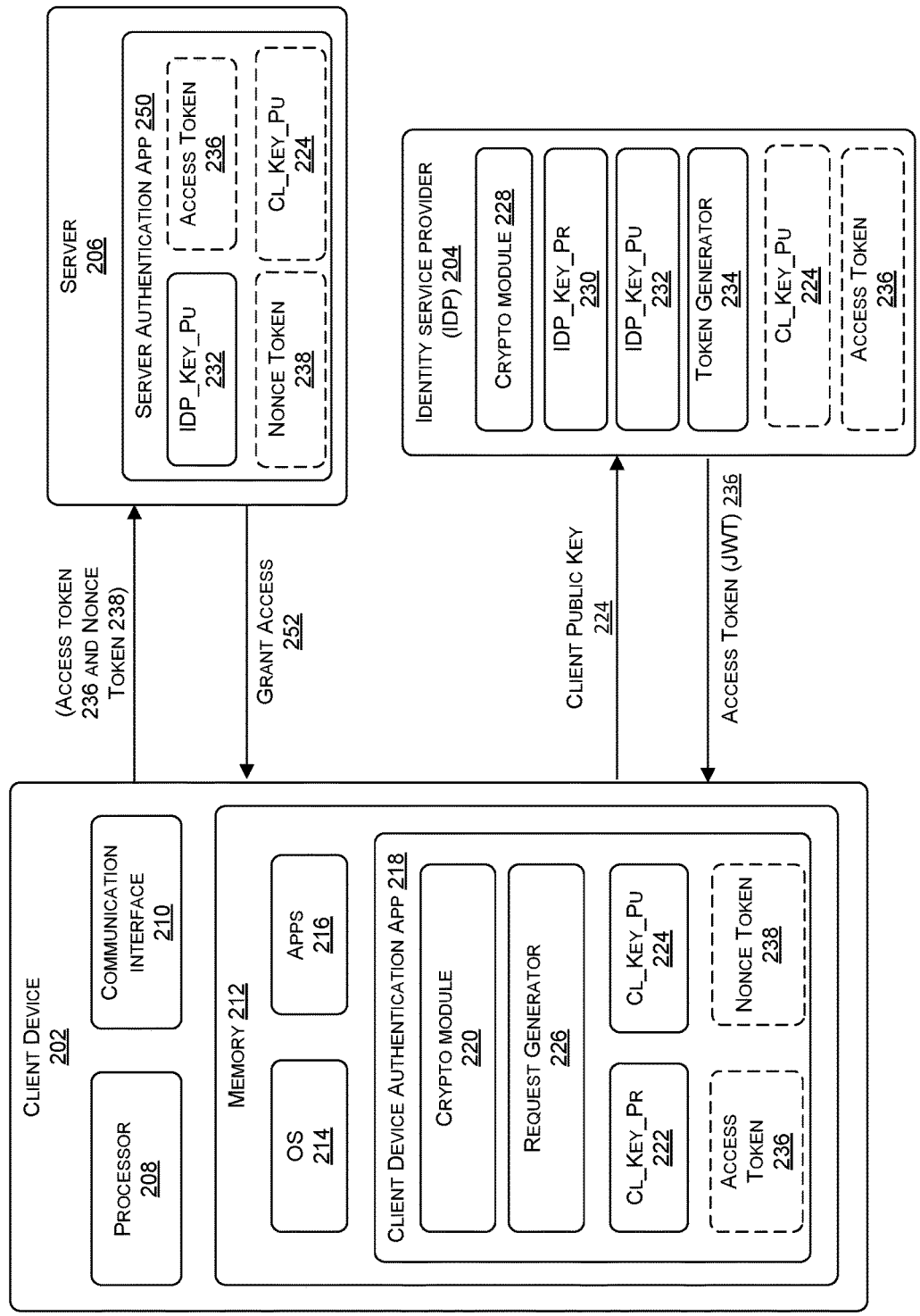
FIG. 2 is a block diagram of an example client-server-identity service provider (IDP) system that shows an interaction between a client device, a server, and an IDP, in accordance with at least one embodiment.

FIG. 2 represents an example client-server-IDP system 200 constructed in accordance with at least implementation of the techniques described herein. The client-server-IDP system 200 may implement an authentication of a web browser in the client device that may be used to facilitate a registration of an unregistered domain to a map of key-value pairs in the domain agnostic access token. The domains that may be listed in the map of key-value pairs may access the server without further reauthentication. It is noted that FIG. 2 includes some elements with a broken line border. A broken line border may indicate that the particular element is not necessarily present at the beginning of one or more operations described herein, but may become available at some point during an operation.

The example client-server-IDP system 200 may include an example client device 202, IDP 204, and an example server 206. The client device 202 (similar to user device 108 of FIG. 1) may be any processor-based device having the capability to perform the operations described herein, such as a cellular telephone, an electronic tablet, a handheld computing device, or a personal computer. The IDP 204 may include a server hosted by an authentication entity that can provide credentials to verified entities. These credentials may be used by an entity to gain access to a secured service in the server 206 that trusts the credentials from the IDP 204. Typically, such a trust relationship may be indicated by a secured service having access to a public key associated with the IDP 204. The server 206 (similar to server 124 of FIG. 1) may provide authorization and access to the secure service. In one example, the server 206 may establish a trust relationship with the IDP 204.

The example client device 202 includes a processor 208 having electronic circuitry that executes instruction code segments by performing basic arithmetic, logical, control, memory, and input/output (I/O) operations specified by the instruction code. The processor 208 can be a product that is commercially available through companies such as Intel® or AMD®, or it can be one that is customized to work with and control any particular system.

The example client device 202 also includes a communications interface 210. The communication interface 210 facilitates communication with components located outside the example client device 202 and provides networking capabilities for the example client device 202. For example, the example client device 202, by way of the communications interface 210, may exchange data with other electronic devices (e.g., laptops, computers, other servers, etc.) via one or more networks, such as the Internet 112 (FIG. 1) or another network 120 (FIG. 1). Communications between the example client device 202 and other electronic devices may utilize any sort of known communication protocol for sending and receiving data and/or voice communications. The client device 202 may also include other hardware components—such as a keyboard, a mouse, a display, a microphone, a camera, and/or the like—and associated software and/or firmware used to carry out client operations.

The client device 202 may include memory 212 that stores data, executable instructions, modules, components, data structures, etc. The memory 212 maybe implemented using computer-readable media, such as computer storage media. Computer-readable media includes at least two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

An operating system 214 may be stored in the memory 212. The operating system 214 includes components that enable the example client device 202 to receive and transmit data via various inputs (e.g., user controls, network interfaces, and/or memory devices), as well as process data using the processor 208 to generate output. The operating system 214 can include a presentation component that presents the output (e.g., display the data on an electronic display, store the data in memory, transmit the data to another electronic device, etc.). Additionally, the operating system 214 can include other components that perform various additional functions generally associated with an operating system. The memory 212 also stores various software applications 216, or programs, that can support electronic device functionality or provide a general or specialized device user function that may or may not be related to the electronic client per se.

A (client device) authentication application 218 may be also stored in the memory 212. The authentication application 218 may include code segments that are executable on the processor 208 to perform client-side functions as described herein. The authentication application 218 may generate and/or gather relevant data to formulate a request to the IDP 204 for an access token that can be used to access and perform authorized transactions on the server 206. In one example, the authentication application 218 may include a cryptography module 220 that can be configured to create a client private key 222 and a client public key 224. The client private key 222 may be stored in a non-serializable format while the client public key 224 may be stored in a serializable format in an index database (e.g., in accordance with the index database described at https://developer.mozilla.org/en-US/docs/Web/API/IndexedDB_AP). The authentication application 218 may also include a request generator 226 that can be configured to create and transmit requests as necessary to implement the described techniques.

The IDP 204 may include an IDP cryptography module 228, an IDP private key 230, an IDP public key 232, and an access token generator 234. The IDP cryptography module 228 may include code segments that are executed to, inter alia, create digital signatures, validate digital signatures, encode, decode, encrypt, and decrypt data transmitted between the client device 202 and the IDP 204. The IDP private key 230 and the IDP public key 232 may include keys that can be unique to the IDP 204 and may be used for digital signing and/or encryption operations. The access token generator 234 may be used to create the access token that can be used by the client device 202 to access secure services from the server 206.

In accessing one or more secure services from the server 206, the client device 202 may register with the IDP 204, which may be trusted by the one or more secure services in the server 206. Trust may be established between the one or more secure services and the IDP 204 by way of a registration process in which a service may register with the IDP 204 and receive the IDP public key 232. As part of a registration request, the authentication application 218 may transmit the client public key 224 to the IDP 204. In at least one implementation, the request may include an HTTP (Hyper Text Transfer Protocol) POST request having client public key 224 encoded in the body of the request. Other information related to the client device 202 and/or a user of the client device 202 may also be included. For example, the information may include a transaction identifier and a client identifier.

The IDP 204 may receive the client device public key 224 from the client device 202 and optionally stores the client device public key 224 locally. The IDP token generator 234 may create an access token 236 that includes the client device public key 224 and other information related to the client device 202 and/or a user thereof. In at least one implementation, the access token 236 may include a JavaScript Object Notation (JSON) Web Token (JWT). The access token 236 may be used by the client device 202 to access one or more secure services in the server 206.

In one example, the client device 202 may utilize the access token 236 to access the service in the server 206. However, transmitting the access token 236 over a network may place the access token 236 at risk of being misappropriated and used by a malicious actor. To protect against a malicious actor being able to detect and steal the access token 236, the authentication application 218 may be configured to create a nonce token 238 (or POP token). The nonce token 238 may include a token signed by the client device and can be used to sign an entire request (e.g., HTTP request). The nonce token 238 can be a JSON Web Token, signed with the client device private key 222, and may be validated with the client public key 224 that can be accessible at a header of a payload in the access token 236 that is communicated to the server 206. In one example, the client device 202 may use the access token 236 as a primary token and the nonce token 238 as a secondary token when accessing the service from the server 206. In this example, the access token 236 may include an index of public keys that may be registered for authorized use of the access token. The index of public keys may include a list or map of key-value pairs in the payload of the access token 236.

The server 206 is shown to include few components but may contain similar components as that of the client device 202. The server 206 may include a (server) authentication application 250 and further possesses the IDP public key 232 as a result of its trust relationship with the IDP 204. In one example, the server 206 receives the access token 236 and the nonce token 238 and uses the IDP public key 232 to validate the access token 236 to make sure that the token is secure and unchanged in the process. The server 206 may further extract the client public key 224 from the header of the nonce token 238. The server authentication module 250 may then use the extracted client public key 224 to validate the nonce token 238 that was signed with the client device private key 222. Upon validation, the server 206 may issue a grant access 252 that may include access to the service.

In one example, the keys stored in the access token 236 may include fingerprints of the actual keys, which can be found in a header of the nonce token 238 along with key ID. To validate a nonce token (e.g., nonce token 238) as described herein, the IDP public key 232 may be used first to validate the access token 236. Thereafter, the actual key value in the header of the nonce token 236 is hashed and compared with fingerprints in the access token 236. The JWK in the header of the nonce token 238 is then used to validate the nonce token 238. After the access token and the nonce token have been established, then the request signature may be validated. For example, the validation may require compiling a request digest from named request fields in the nonce token 238 ('eiht' field), hashing the digest to make a fingerprint, and matching the fingerprint with 'eidt' field in the nonce token 238.

In one example, the client device private key 222 and the client public key 224 may be asymmetric keys. As a result, the server 206 may be able to confirm at least two things: (1) that the client public key 224 was used to obtain the access token 236 from the IDP 204 that is trusted by the server 206; and (2) that the nonce token 238 was not altered since being created by the client device 202. Furthermore, the client device private key 222 was not ever transmitted over a network and, therefore, could not be stolen and used by an unauthorized entity to gain access to the server 206. Further, the client device private key 222 may be stored in a non-serializable format in the indexedDB and thus, the man-in-the-middle cannot intercept the client device private key 222 for a "replay" attack.

With the authentication of the client device 202 and thus, the validation of the web browser as originating from the client device 202, the validated web browser may be used to facilitate the registration of the domains that are not listed in the confirmation claims of the access token 236. In this regard, the server 206 may be assured that the facilitating web browser may not be originating from a cross-site scripting attack. An example access token are further described below.

Example Access Token

Figure 3:
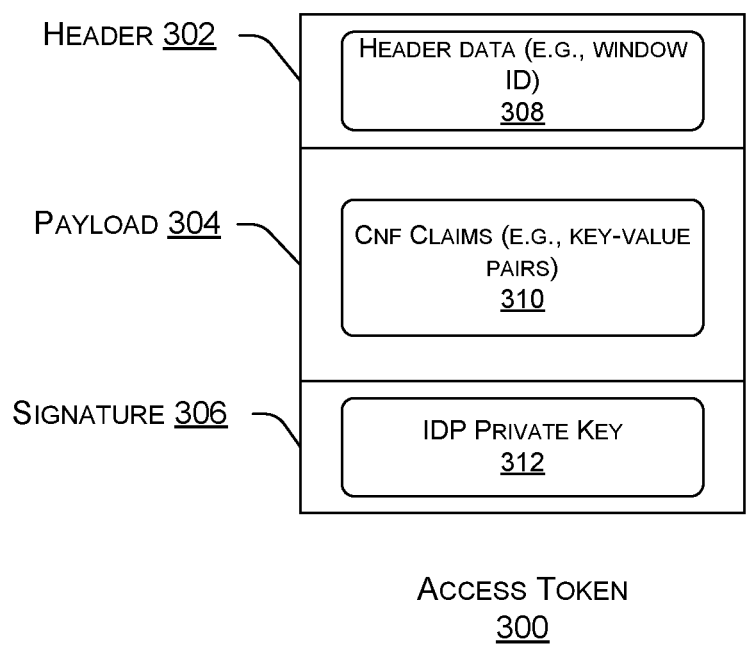
FIG. 3 is a block diagram of an example access token, in accordance with at least one embodiment.

FIG. 3 is an example of access token 300 according to one or more implementations of the techniques described herein. The access token 300 may include, for example, a data structure having a format of a standard JWT. The access token 300 may include a header 302, a payload 304, and a signature 306.

The header 302 may include header data 308 such as a type of the token and a digital signing algorithm used with the token (e.g., HMAC SHA256, RSASSA-PSS, etc.). In one example, the header data may include a window identity (ID) of an opened window browser. The window ID may be used to track the activity of the web browser during cross-window operations as described in subsequent figures. The header data 308 may be encoded using Base64, Base64url, or some other mutually recognized scheme to produce the header 302. An example of a header is shown below:

b64 ({
   typ: 'JWT',
   alg: 'PS256'
})

In this example, the header indicates that the token type is a JSON Web Token, and that the PS256 algorithm identifies the algorithm for signing the token using the IDP private key, hence, the algorithm for validating the token with the corresponding public key.

The payload 304 (sometimes referred to as a "body"), may include statements about an entity and may contain additional data. In the example provided, the payload 304 may include a confirmation claim 310 to implement the cross-domain operation as described herein. In one example, the confirmation claim 310 may include a map of key-value pairs where each key-value pair may indicate the domain or subdomains that may be authorized to use the access token 300 for automatic authentication. The key-value pair may map the public keys of different domains and/or subdomains to key IDs. Thus, when the key ID and JSON Web Key (JWK) of a domain may be found to be listed in the confirmation claim 310, then the domain may access a corresponding service without further reauthentication.

In a case where the key ID and the JWK of a particular domain may not be listed in the confirmation claim 310, then an access request from the particular domain may be redirected to an already registered domain that has access to cryptographic keys (e.g., private key and public key) of the client device. In this manner, the already registered domain that may send the request to register the particular domain in the confirmation claim 310 may be authenticated to be a genuine source of the request to register.

The signature 306 may be created by signing the encoded header 302 and the encoded payload 304 with an identity provider private key 312 (similar to the IDP private key 230 of FIG. 2). The signature 306 may be created using the digital signature algorithm identified in the header data 308 (e.g., HMAC SHA256, RSASSA-PSS, etc.).

Example Web Browser Operation at a Client-Side

Figure 4:
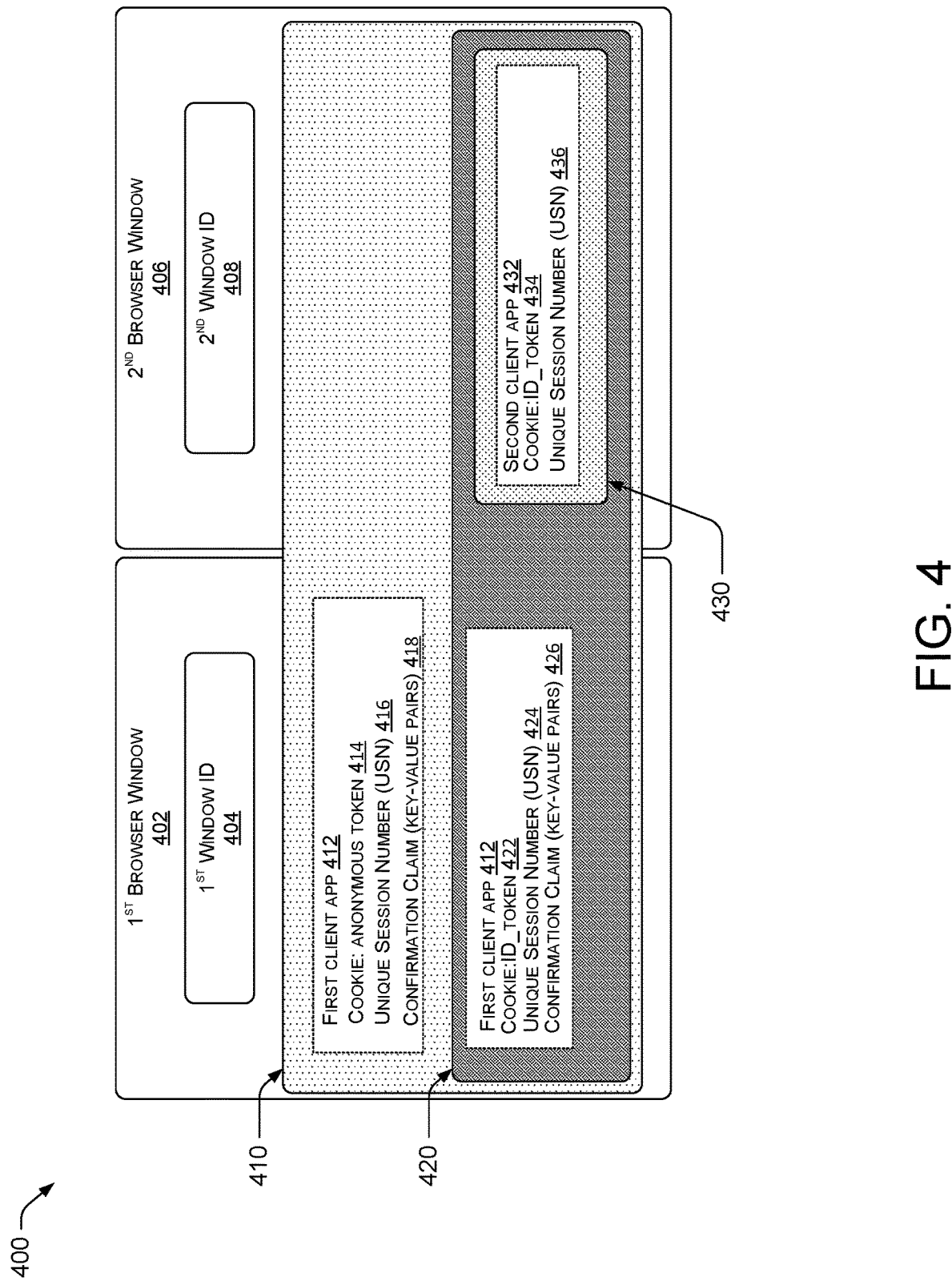
FIG. 4 is a block diagram showing an example web browser operation during a cross-domain operation, in accordance with at least one embodiment.

FIG. 4 is a block diagram 400 showing a web browser operation that may include starting an application to establish an anonymous session state, logging in to establish a first authenticated session state, and registering a new domain to open a second authenticated session state. The block diagram 400 may illustrate a user who may access multiple domains (or client apps) that may belong to a single MNO. The block diagram 400 may show a tracking of web browser and activities of the user by using a window identification (window ID) for an opened browser window, anonymous token, generated identification token (id_token), and/or a unique session number (USN). The anonymous token or the id_token depending upon the current session state of the web browser may represent the access token as described herein.

As shown, the block diagram 400 may include an opened first browser window 402 with a first window ID 404, a second browser window 406 with a second window ID 408, an anonymous session state 410, a first domain session state 420, and a second domain session state 430 within the first domain session state 420 but in a different tab or browser window. The anonymous session state 410, first domain session state 420, or second domain session state 430 may be shared across different tabs such as the opened first browser window 402 and the second browser window 406; however, the first domain session state 420 and the second domain session state 430 may not be concurrently established. For example, the anonymous session state 410 may be shown to overlap with the opened first browser window 402 and the second browser window 406. The first window ID 404 and the second window ID 408 for the opened browser windows may be used to track the activities of the user and/or the operation of the web browser. Only two browser windows are shown for purposes of illustration and multiple browser windows may be opened without changing the embodiments described herein.

The anonymous session state 410 may be associated, for example, with a first client app 412 that may include a startup application loaded by the web browser, a requested anonymous token 414 to allow secure communication between the web browser and a backend server (not shown), a unique session number (USN) 416 that may be issued by the backend server to track the user activity at the anonymous session state 410, and a JWT confirmation claim 418 that may include the map of key-value pairs corresponding to the domains or subdomains that may be authorized to use the access token, which includes the anonymous token 414 at the anonymous session state 410.

The first domain session state 420 may be associated, for example, with the first client app 412 when the user logs in, an identification token (id_token) 422 that may indicate an authenticated session state upon logging in by the user, a USN 424 that may be used to track the first domain session state 420, and a JWT confirmation claim 426 that may include the map of key-value pairs corresponding to the domains or subdomains corresponding to the domains or subdomains that may be authorized to use the access token, which includes the id_token 422 at the first domain session state 420. At the first domain session state 420, the id_token 422 may replace the anonymous token 414 in a cookie.

The second domain session state 430 may be associated, for example, with a loaded second client app 432, an id_token 434 that may indicate an authenticated session for the second client app 432, and a USN 436 that may be used for tracking of user or web browser operation. In one example, the anonymous token 414 and the id_token 422/432 may be passed as cookies and shared across the different tabs or windows. Further, the first client app 412 and the second client app 432 may belong, for example, to a single MNO such that they can be registered via the same domain agnostic access token to avoid the use of separate access tokens when the user toggles between these client apps. If the client app is loaded from a domain that is not supported by the cookie, then that cookie is not accessible to the client app. Hence, the client app may have access to the access token at any time whether it is anonymous token or authenticated token.

In an example embodiment, the web browser opens the first browser window 402 and loads the first client app 412. The first client app 412 may be configured to generate the first window ID 404 to identify the opened browser window 402 during the initial startup. The first client app 412 may then send a request for an anonymous token to the backend server, and the backend server may return the requested anonymous token 414, which is passed as a cookie, to the first client app 412. In this example embodiment, the USN 416 may be supplied in the anonymous session state 410.

The first client app 412 may further request public data from the backend server and in return, the backend server may send the requested public data to the web browser where a webpage showing the anonymous session state 410 may be displayed including the public data. The public data may include, for example, the anonymous token 414 and the USN 416. The confirmation claim 418 may be embedded in the payload of the anonymous token 414.

In one example, when the browser session is at a cold start state and that the anonymous token 414 is not yet existing, the nonce token, which is self-signing and includes both the actual key value and key ID on its header, may be used to introduce the first client app 412 in the server. Thereafter, the server establishes the anonymous session state 410 by issuing the anonymous token 414 along with the USN 416.

When a user logs in with a username and a password, the backend server may validate the request including the anonymous token 414, and return an id_token (e.g., id_token 422), which is passed as a cookie, to the first client app 412. In one example, the id_token 422 may replace the anonymous token 414 in the cookie. Further, the first client app 412 may request private data from the backend server and the backend server returns the private data to the first client app 412. The web browser may then facilitate the displaying of a private view (e.g., first domain session state 420) including the private data. The private data may include the id_token 422, the USN 424, and the confirmation claim 426.

In one example, the second client app 432 may load in the same browser window as the first client 412 and basically replacing the first client app 412 in that browser window. Alternatively, the second client app 432 may load in a separate browser window or tab where it can run concurrently with the first client app 412. In either case, the second client app 432 may share the same id_token as the first client app 412.

In one example embodiment, the web browser opens the second browser window 406 and loads the second client app 432, which currently may not be registered in the confirmation claim 418/426 of the already registered first client app 412. In this embodiment, the backend server, which may receive the access request from the second client app 432, can handoff the access request to the web browser.

For example, the second client app 432 may send an access request to the backend server, and the backend server redirects this access request to the validated web browser and particularly, the already registered first client app 412. The already registered first client app 412, which has access to the cryptographic keys of the validated web browser (or the client device), may sign a request to add the public key of the second client app 432 in the confirmation claim 418 or 426 depending upon the present session state of the web browser. The cookies are then updated and the second client app 432 may now access the corresponding service provider without further reauthentication. For example, the second client app 432 may utilize the same domain agnostic access token used in the anonymous session state 410 and the first domain session state 420 to access the service provider. Additional details of the web browser initial startup, validation, and redirecting of the access request by the unregistered domain is further described in subsequent figures.

Example Implementation—Anonymous Session State

Figure 5:
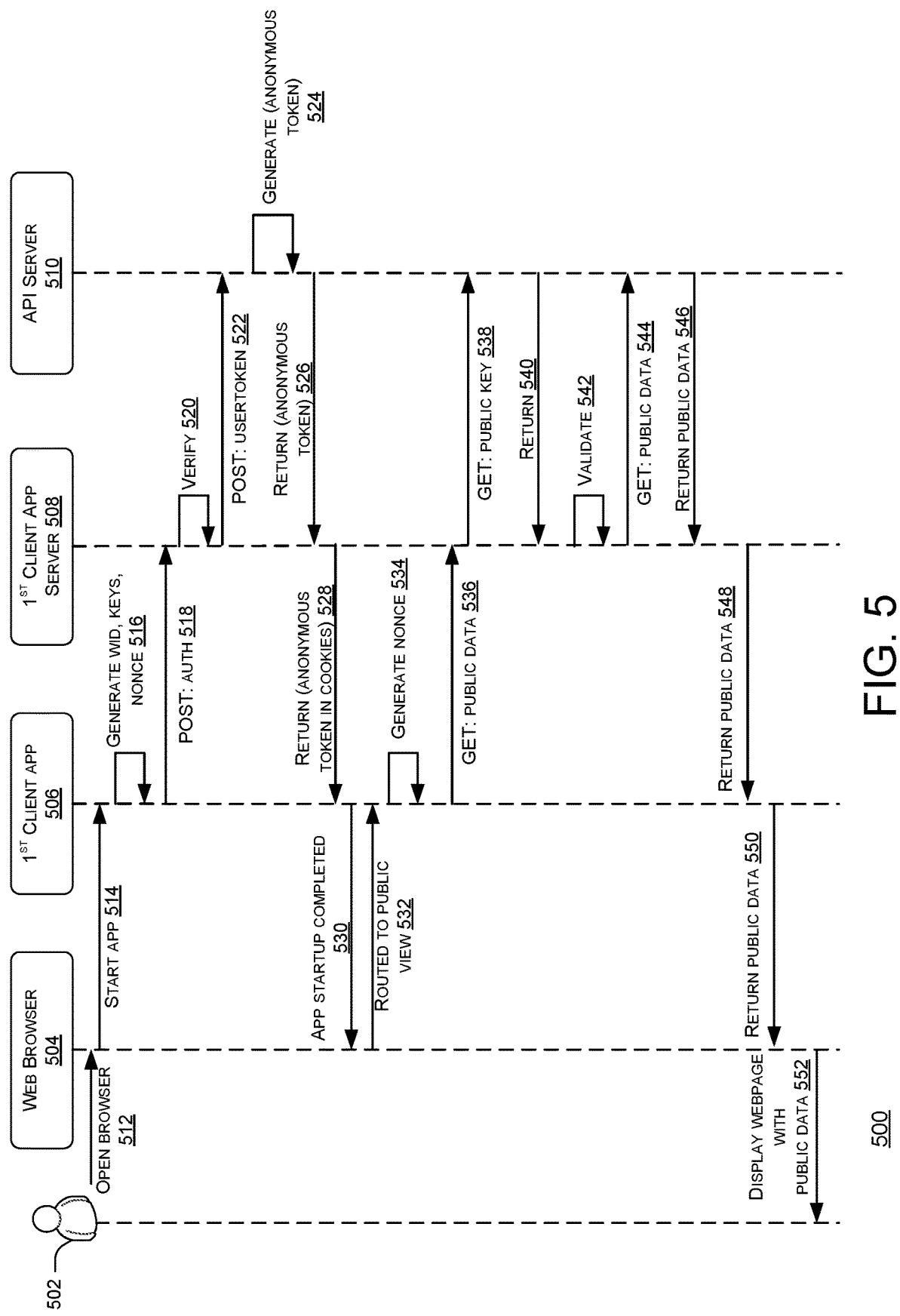
FIG. 5 is an example sequence diagram that depicts an initial startup operation of the web browser during the cross-domain operation, in accordance with at least one embodiment.
Figure 6:
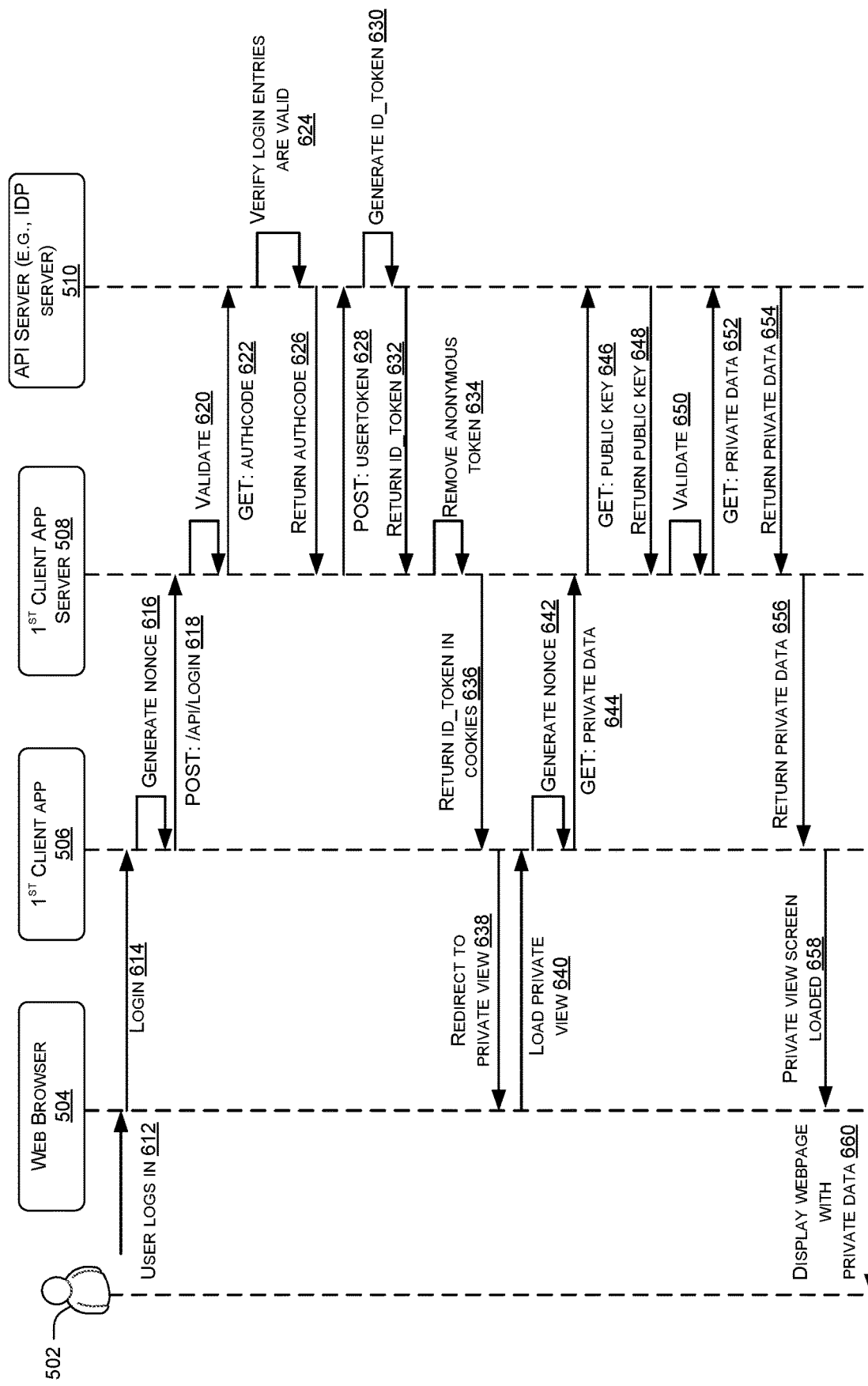
FIG. 6 is an example sequence diagram that depicts a transitioning in the web browser from an anonymous session state to an authenticated session state, in accordance with at least one embodiment.
Figure 7:
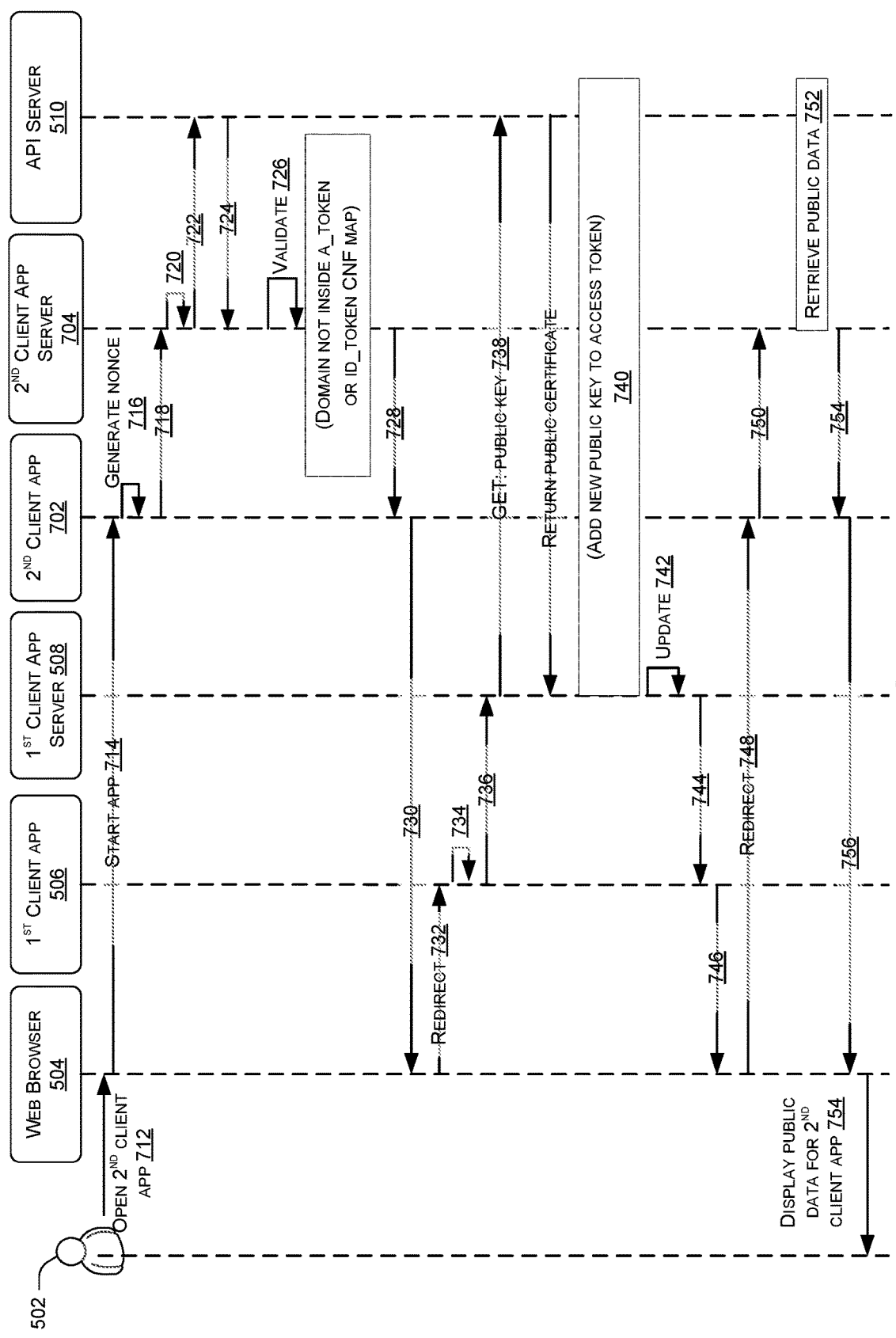
FIG. 7 is an example sequence diagram that depicts an example registration of a new domain in order for the new domain to access a backend server without further reauthentication, in accordance with at least one embodiment.

FIGS. 5-7 present illustrative steps for the web browser operation as described in FIG. 4 above. Particularly, FIGS. 5-7 may respectively depict the starting of the application to establish the anonymous session state, logging in to establish the first authenticated session state, and the registering of the new domain to open the second authenticated session state.

FIG. 5 is a sequence diagram 500 that depicts an initial startup operation of the web browser during a cross-domain operation. The sequence diagram 500 may illustrate in detail the establishment of the anonymous session state 410 of FIG. 4. As shown, the sequence diagram 500 may include a user 502, a web browser 504, a first client app 506 (similar to first client app 412 of FIG. 4), a first server 508, and an Application Program Interface (API) server 510. The first server 508 may be similar to the backend server 124 of FIG. 1 that can run secure services. The API server 510, which may be integrated with the first server 508, can receive a request and send responses to the first server 508 or web browser 504. The API server 510 may be an example of the IDP server.

In one example, the user 502 may open 512 the web browser 504 cold and perform a startup application 514 to load the first client app 506. Since the web browser can be started cold and a window ID and crypto keys have yet to be generated, the first client app 506 may be configured to generate 516 the window ID (e.g., first window ID 404 of FIG. 4), cryptographic keys (e.g., client device private and public keys), and a nonce token that may be signed using the generated private key.

The first client app 506 may then use the nonce token to sign a request (e.g., POST: /api/auth 518) for an anonymous token to allow a secure communication between the web browser 504 or first client app 506 and the first server 508. The nonce token, which is self-signing and includes both the actual key value and key ID on its header, may be used to introduce the first client app 506 to the first server 508. The first server 508 may receive the request from the first client app 506 and can verify the received nonce token using the public key that may be extracted along with the key ID from the header of the nonce token. An example request from the first client app 506 is shown below:

Headers: {
"x-nonce": <jwt>
"x-wid": <uuid>
}

In this example, the header of the nonce request may include the public key (or JWK) for the first client app 506 along with the key ID. The headers of the request may include the nonce token (e.g., JWT) and a unique user identifier (uuid) for the window ID (x-wid). The first server 508 may use the public key embedded in the nonce token 516 to verify 520 the nonce token. It is noted that in a cold start, the request may not have to send the public key separately as the public key can be embedded and sent through the nonce token 516. However, when a new key ID is to be registered to an existing token, then the public key along with the key ID may be sent separately since the nonce token may utilize the public key that is already registered with the existing access token.

The first server 508 may further check the cookies for the anonymous token and if no anonymous token is present in the cookies for the starting of the application 514, then the first server 508 may send request (e.g., POST: /api/atms/v1/usertoken 522) to the API server 510. For all requests as described herein, a generated nonce token may be used to sign the request to authenticate that the sender of the request is who claims it is.

In one example, the API server 510 may generate 524 the anonymous token and return 526 the generated anonymous token to the first server 508. The generated anonymous token (e.g., anonymous token 414 of FIG. 4) may be associated with the confirmation claim (e.g., confirmation claim 418 of FIG. 4) and USN (e.g., USN 416 of FIG. 4) that can be generated by the API server 510. The first server 508 returns 528 the anonymous token in cookies, and the startup application is completed 530.

To get the public data, the web browser 504 may be routed 532 back to the first client app 506. The first client app 506 may generate 534 a nonce token to sign the request public data (e.g., GET: /api/publicdata 536) and in response to receiving of the request public data, the first server 508 may retrieve (e.g., GET: /api/tms/v3/publickey 538) the public key from the API server 510. The first server 508 may receive the public key (e.g., return public certificate 540) and validates 542 the anonymous token, nonce token, and the request for public data. With the validated anonymous token, nonce token, and request, the first server 508 retrieves (e.g., GET: /api/publicData 544) the public data from the API server 510 and returns (e.g., return public data 548, 550) the public data to the web browser 504. The web browser 504 may then display 552 a webpage with the retrieved public data. The public data, for example, may include the window ID, anonymous token, and the USN.

In an example embodiment, the displaying 552 of the webpage with the public data may be similar to the anonymous session state 410 of FIG. 4. In this embodiment, the described generation of the nonce tokens that may sign the request may prevent man-in-the-middle "replay" attack.

Example Implementation—Anonymous Session to Authenticated Session

FIG. 6 is a sequence diagram 600 that depicts a shifting of the anonymous session state (e.g., anonymous session state 410 of FIG. 4) to the authenticated session state (e.g., first domain session state 420 of FIG. 4). The sequence diagram 600 assumes that the anonymous session state has been set up following the process described in FIG. 5 above. In one example, to register a new key to an existing access token, the public JWK and the key ID may be passed separately as the nonce token utilizes a public JWK that is already registered with the confirmation claim of the existing access token. This indicates that the nonce token is self-referential such that the public JWK from the header of the nonce token is used to validate the nonce token.

The sequence diagram 600 may illustrate in detail the first domain session state 420 of FIG. 4. As shown, the sequence diagram 600 may include the same user 502, web browser 504, first client app 506, first server 508, and the API server 510. The first server 508 may be similar to the backend server 124 of FIG. 1 that can provide secure services. The API server 510, which may be a part of the first server 508, can receive a request and send responses to the first server 508 or the web browser 504.

After establishing the anonymous session state in FIG. 5, the web browser may check if the id_token is found in the cookie. If the id-token may not be found in the cookie, then the user 502 may log in 612, 614 in the first client app 506. The first client app 506 may be configured to generate 616 the nonce token and sign a request (e.g., POST: /api/login 618) to the first server 508. The first server 508 may receive the nonce token and the request from the first client app 506, request for a public certificate from the API server 510, and then validate 620 the nonce token, anonymous token, and the received request. It is noted that if an existing access token previously exists in the cookie store, then the first client app 506 may not create a new access token and instead will simply request to be added to existing access token, whether anonymous or authenticated.

The first server 508 may then send a request (e.g., GET: /api/authcode 622) to the API server 510, and the API server 510 may verify 624 a validity of entered username and password. The API server 510 returns an authcode to the first server 508, and the first server 508 may extract the confirmation claim from the autonomous token. The first server 508 may thereafter send a request (e.g., POST: /api/tms/v3/usertoken 628) to the API server 510, and the API server 510 generates 630 the id_token and returns 632 the id_token to the first server 508.

The first server 508 may then remove 634 the anonymous token in the cookies and replaces it with the id_token. The first server 508 may further return 636 the id_token in the cookies to the first client app 506. Thereafter, the first client app 06 may redirect 638 the web browser to private view. The generated id_token (e.g., id_token 422 of FIG. 4) may be associated with the confirmation claim (e.g., confirmation claim 426 of FIG. 4) and USN (e.g., USN 424 of FIG. 4) that can be generated by the API server 510.

To get the private data, the web browser 504 may load 640 a private view screen and send the request to the first client app 506. The first client app 506 may again generate 642 a nonce token to sign a request private data (e.g., GET: /api/private data 644) to the first server 508. In response to the received request private data, the first server 508 may retrieve (e.g., GET: /api/tms/v3/publickey 646) the public key from the API server 510. The first server 508 may receive the public key (e.g., return public certificate 648) and validates 650 the id_token, nonce token, and the request for private data. With the validated id_token, nonce token, and request, the first server 508 retrieves (e.g., GET: /api/privateData 652) the private data from the API server 510 and returns (e.g., return private data 654, 656) the private data to the web browser 504. The private view screen of the web browser 504 may then be loaded 658 and displays 660 a webpage with the private data. The private data, for example, may include the id_token, and the USN.

In an example embodiment, the displaying 652 of the web page with the private data may be similar to the authenticated session state (e.g., first domain session state 420) of FIG. 4.

Example Implementation—Registering New Key-Value Pair of a New Domain

FIG. 7 is a sequence diagram 700 that depicts an example registration of the new domain in the confirmation claim of the access token in order for the new domain to access the backend server without further reauthentication. The sequence diagram 700 assumes that the anonymous session state or the authenticated session as described in FIG. 5 or FIG. 6 has been set up. In one example, the registration may include adding the key-value pair corresponding to the new domain in the map of key-value pairs in the confirmation claim of the anonymous token and the id_token.

The discussion of the sequence diagram 700 is related to FIGS. 5-6 and thus, the sequence diagram 700 similarly includes the user 502, web browser 504, first client app 506, first server 508, and the API server 510. In addition, the sequence diagram 700 depicts a second client app 702 and a second server 704.

In one example, the second client app 702 may be associated with the second domain having a key-pair value that has yet to be registered in the map of key-value pairs in the confirmation claim of the access token (e.g., anonymous token and the id_token) in the cookies. In this regard, the second client app 702 (e.g., unregistered second domain) may use a different access token even though this second client app, and the already registered first client app 506, may belong to the same MNO. As further described below, the validated web browser 504 may facilitate the registration of the public key of the second client app 702 in the confirmation claim of the access token so that the second client app 702 may be granted access (e.g., public data) without further reauthentication. It is noted that the first server 508, second server 704, and the API server 510 may be separated for illustration purposes; however, these servers may be integrated into a single server.

In one example, after an establishment of the authenticated session state in FIG. 6, the user 502 may open 712 a second domain (e.g., second client app 702) in the web browser 504. For example, the second domain may include "sub.local.com" while the first domain may include "local.com." The opening of the "sub.local.com" may be necessary if the opening is served from a different subdomain from the "local.com." In one example, the "local.com" first domain and the "sub.local.com" second domain may belong to the same MNO. The web browser 504 may then initiate a start application 714 on the second client app 702 (e.g., new domain), and the second client app 702 can generate 716 cryptographic keys and a nonce token that can be used to sign an access request (e.g., POST: /api/auth 718) to the second server 704.

The second server 704 may then extract 720 the anonymous token or the id_token from the cookie depending upon the current state of the web browser 504. With the extracted anonymous token or id_token from the cookie, the second server 704 may send a request (e.g., GET: /api/tns/v3/publickey 722) to the API server 510, and the API server 510 returns 724 a public certificate to the second server 704. In one example, the second server 704 may validate 726 the nonce token using the public key of the second client app 702 in the body of the received request, and further validate 726 the extracted anonymous token or id_token. The second server 704 may then check if the public key of the second client app 702 is present in the anonymous token or id_token.

Given a situation where the public key of the second client app 702 may not be present or listed in the confirmation claim of the anonymous token or id_token, then the second server 704 may return 728 a handoff redirect url in response to the POST: /api/auth 718. The second client app 702 may receive the handoff redirect url response and sends 730 to the web browser 504 handoff url parameters that may include the public key of the second client app 702, the redirect-url, and the domain.

To register the public key of the second client app 702 in the access token, the web browser 504 may redirect 732 the handoff to the first client app 506, and the first client app 506 generates 734 a nonce token using the private key of the first client app 506. The first client app 506 may also sign a POST: /api/ 736 to put a request to the API server to add the new key-value pair to the access token map. An example request is shown below:

Headers: {
  "x-nonce": <jwt>
  "x-wid": <uuid>
  Cookie:   "usn=<uuid>;   id_token=<jwt>   or
    a_token=<jwt>"

Body: {
  redirect to: <url>
}
}

In this example, the body contains the "redirect_to" where the API server 510 should redirect the browser to after the new key-value pair have been added to the access token.

In one example, the first server 508 may retrieve (e.g., GET: /api/tms/v2/public key 738) the public key from the API server 510, and the API server 10 returns a public certificate to the first server 508. The first server 508 may then validate the anonymous token or id_token, the nonce token, and the request. In addition, the first server 508 may detect that the handoff needs to happen and consequently, the first server 508 may be configured to initiate the adding 740 of the public key of the second client app 702 in the access token (e.g., anonymous token and the id_token). The adding may include registering the key-value pair of the second client app 508 in the map of key-value pairs in the confirmation claim of the anonymous token and the id_token. For example, the first server 508 may send a request to the API server 510, and the API server 510 may add the public key of the second client app 702 to the confirmation claim in the access token (e.g., anonymous token and the id_token).

In some cases, the claim in the access token may give the API server 510 a clue where to redirect to for a signed handoff request. For example, the access token has a claim:

'key_domain': 'www.website.com'

Corresponding to the domain of the first client app, the example claim above may give a clue to the API server 510 where to redirect to for the signed handoff request. This redirection may load a mini page that simply validates the request, collects the keys from IndexedDB for the current domain, and signs a request back to the API server to add the new key-value pair to the access token. For example, the request includes:

headers:
  x-nonce: <jwt>
  x-wid: <uuid>
  cookie: "usn=>uuid>; a_token=<jwt>"
}
body:
  token: <jwt>,
  redirect to: <url>
}

In this example, the 'x-nonce' may include the token that signed by the second (domain) client app.

Upon registration or addition of the public key of the second client app 702 to the anonymous token or id_token, the first server 508 may update 742 the anonymous token or id_token in the cookie. The first server 508 may then return 744 the response to the first client app 506, and the response is forwarded 746 to the web browser 504.

The web browser 504 may redirect 748 to the second client app 702 the checking of the public key of the second client app 702 in the anonymous token or id_token. The second client app 702 may then generate a nonce token and sign an access request (e.g., GET: /api/publicdata 750) to the second server 704. An example request from the second client app 702 is shown below:

Headers: {
"x-nonce": <jwt>
"x-wid": <uuid>
Cookie: "usn=<uuid>; id_token=<jwt> or a_token=<jwt>"
}

In this example, the second server 704 may retrieve (e.g., GET: /api/tms/v2/public key) the public key from the API server 510, and the API server 10 returns a public certificate to the second server 704. The second server 704 may then validate the anonymous token or id_token, the nonce token, and the request. In addition, the second server 704 may retrieve the public data 752 from the API server 510 and returns 754 the public data to the second client app 702. The second client app 702 may then render 756 the public data in the web browser 504, and the user 502 may now view the public data for the second client app 702.

In an example embodiment, and upon the registration of the public key of the second client app 702 in the anonymous token or id_token, the second client app 702 may be granted access to the public data without further reauthentication.

In some embodiments, a particular application in the apps 216 of the client device (FIG. 2) may perform the described functions of the web browser 504. For example, the particular application may receive the handoff redirect url response and redirect this handoff to the first client app 506, and so on.

Example Implementation—Establishing an Anonymous Session State

Figure 8:
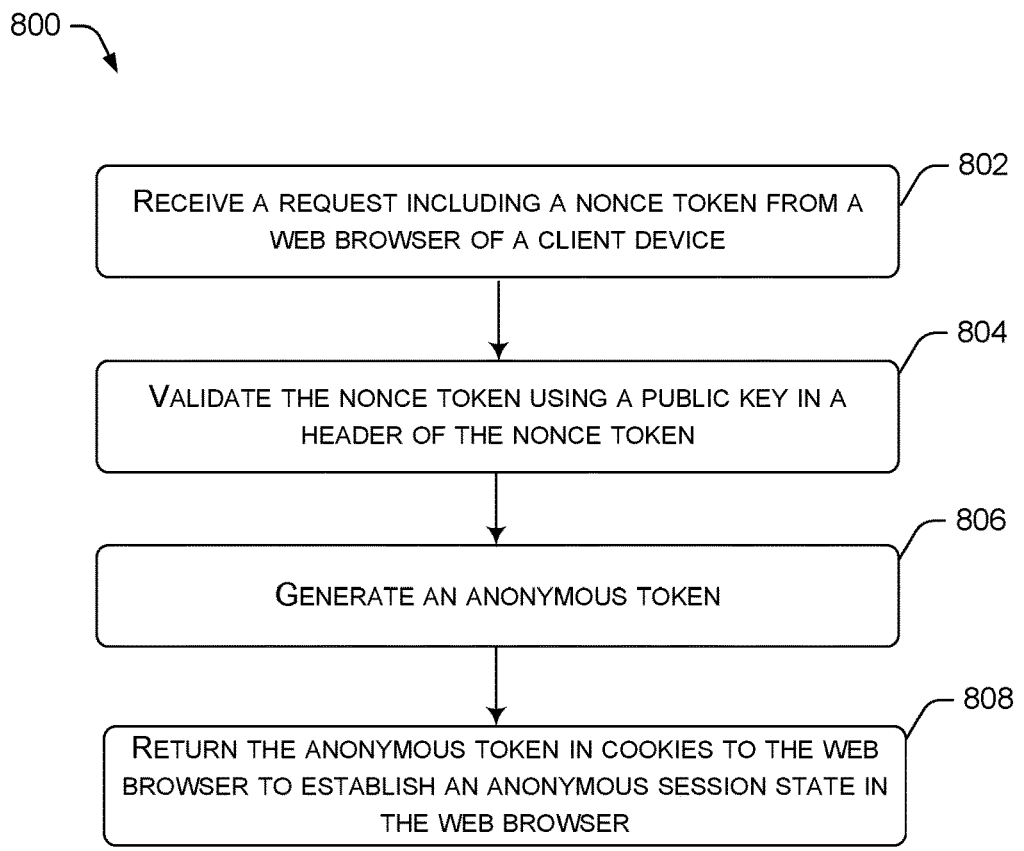
FIG. 8 is a flow diagram of an example methodological implementation for validating the web browser and establishing of the anonymous session state, in accordance with at least one embodiment.

FIG. 8 is a flow diagram 800 that depicts a methodological implementation of at least one aspect of the techniques for validating the web browser (e.g., web browser 504 of FIG. 5) and establishing of the anonymous session state as described herein. The validating of the web browser may include verifying the requesting client device to be who claims it is in order to avoid man-in-the-middle "replay" attacks. The flow diagram 800 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. In the following discussion, reference will be made to elements and reference numerals identified in the discussion of previous figures.

At block 802, the server (e.g., server 206) running a secure service may receive from the client device (e.g., client device 202) an access request to the secure service. The access request may include a nonce token 238, which is self-signing and includes a public JWK and corresponding key ID on its header. In at least one implementation, the request may include an HTTP request that includes the nonce token 238 in an authorization header, although other request formats may be used. In this implementation, the nonce token 238 may include header data, body data, and the signature is created with the client device private key.

At block 804, the server 206 validates the nonce token 238 using the public JWK from the header of the nonce token 238.

At block 806, the server 206 may utilize an API server (e.g., API server 510) to generate the anonymous token 414. In one example, when the browser session is at a cold start state and that the anonymous token 414 is not yet existing, the nonce token, which is self-signing and includes both the actual key value and key ID on its header, may be used to introduce the first client app 412 in the server 206. Thereafter, the server 206 establishes the anonymous session state 410 by issuing the anonymous token 414 along with the USN 416 and window IDs (e.g., first window ID 404) that may be used to track activity of the web browser and/or the user in the client device. In one example, the associated USN and the window ID may also be used to verify that the client device is the device who claims it is.

At block 808, the server 206 returns the anonymous token to the web browser to establish an anonymous session state in the web browser. For example, the anonymous token 414 may be returned in a cookie to establish the anonymous session state 410.

Example Implementation—Registering a New Domain

Figure 9:
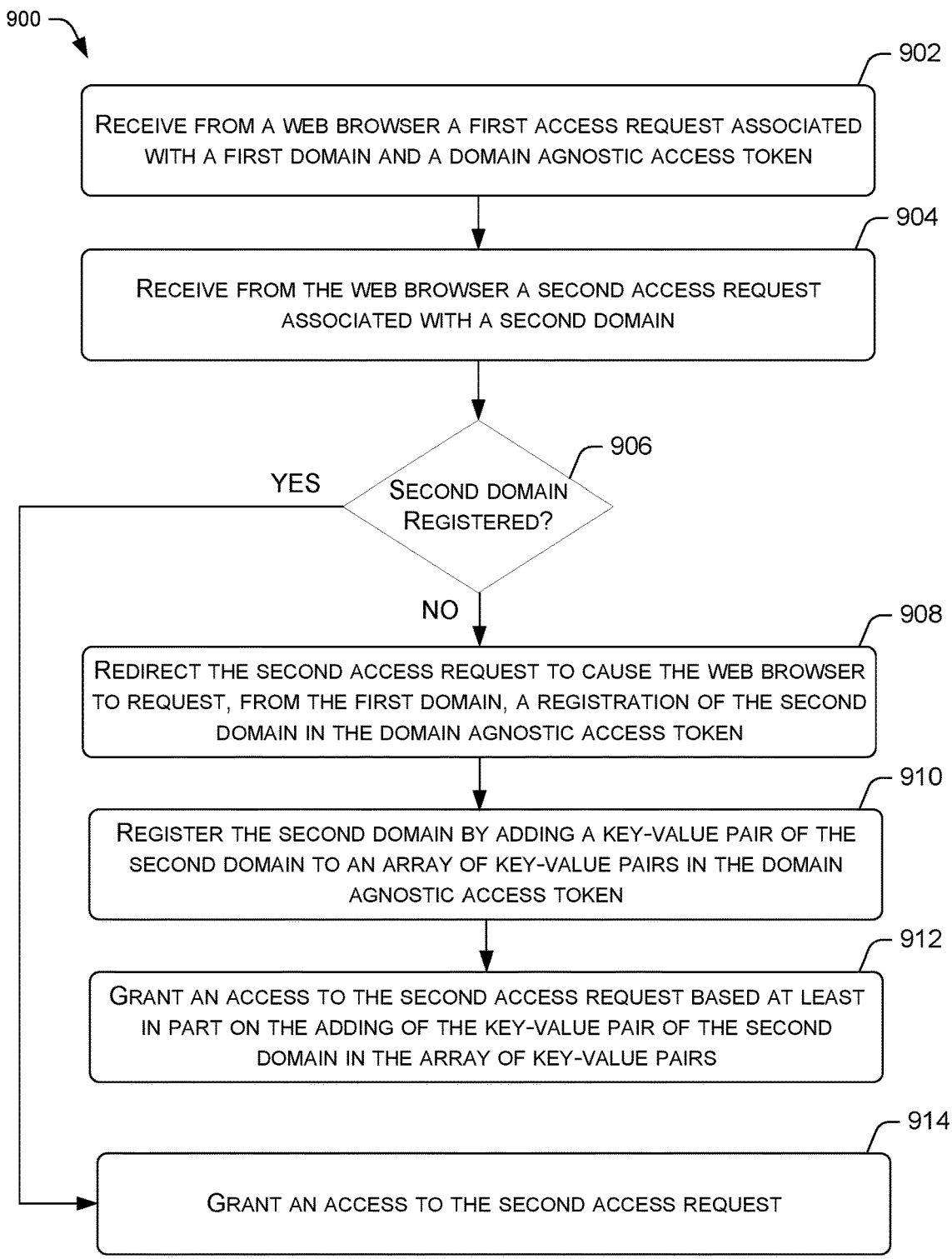
FIG. 9 is a flow diagram of an example methodological implementation for adding a new key-value pair associated with the new domain to a map of key-value pairs in a confirmation claim of the access token, in accordance with at least one embodiment.

FIG. 9 is a flow diagram 900 that depicts a methodological implementation of at least one aspect of the techniques for adding a new key-value pair of a new domain to the map of key-value pairs in the confirmation claim of the access token. Particularly, the new key-value pair is added to the confirmation claim of the anonymous token or the id_token in the anonymous session state or authenticated session state, respectively. The flow diagram 900 assumes that the web browser has been previously validated as described in FIG. 8 above. The flow diagram 900 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. In the following discussion, reference will be made to elements and reference numerals identified in the discussion of previous figures.

At block 902, the first server (e.g., first server 508) may receive from the web browser (e.g., web browser 504) a first access request (e.g., POST: /api/login 618) associated with a first domain (e.g., first client app 506). For example, when the web browser is at the anonymous session state, the first client app 506 may send a generated nonce token and the anonymous token to the first server 508. The generated token may be signed using a private key of the first client app 506. In this example, the first server 508 may validate the anonymous token associated with the first access request and the nonce token to authenticate the sender of the first access request. Upon validation of the first access request, the first server 508 may request an id_token (e.g., id_token 422 of FIG. 4) from the API server 510 and replace the validated anonymous token in the cookie with the requested id_token 422. At this stage, the previous anonymous session state is transformed into an authenticated session state.

At block 904, the second server (e.g., second server 704) may receive from the web browser 504 a second access request (e.g., POST: /api/auth 718) associated with a second domain (e.g., second client app 702). In one example, the second client app 702 may generate a nonce token and send the nonce token including the anonymous token or the id_token to the second server 704. The anonymous token or the id_token may be included in the request depending upon whether the web browser is currently in the anonymous session state or the authenticated session state. In this example, the second server 704 may extract the anonymous token or id_token in the cookie and validates the extracted token and the nonce token.

At decision block 906, the second server 704 determines whether a key-value pair corresponding to the second domain is registered in the confirmation claim of the extracted anonymous token or extracted id_token. Given a situation where the key-value pair of the new domain is not listed in the map of key-value pairs in the confirmation claim of either the extracted anonymous token or id_token ("NO" at block 906), then, at block 908, the second server 704 may redirect the second access request to cause the web browser 504 to request, from the first domain, a registration of the second domain in the confirmation claim of the domain agnostic access token (e.g., extracted anonymous token or id_token).

At block 910, the first domain (e.g., first client app 506) may send a request to the first server 508 to add a new key-value pair of the second domain in the confirmation claim of the domain agnostic access token. In one example, the first server 508, in communication with the API server 510, may add the new key-value pair of the new domain (e.g., second client app 702) in the confirmation claim of the anonymous token and id_token. The confirmation claim may include a map of key-value pairs with each key-value pair corresponding to a domain in a plurality of domains.

At block 912, the second server 704 may grant the second access request based at least in part on the addition of the key-value pair of the new domain to the map of key-value pairs in the confirmation claim of the domain agnostic access token.

Returning to the decision block 906, when the key-value pair for the second domain has already been registered, then, at block 914, the second server 704 may grant the second access request based at least in part on the determination that the key-value pair of the second domain is listed in the map of key-value pairs in the confirmation claim of the anonymous token or id_token.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more computer-readable storage media collectively storing computer-executable instructions that upon execution cause one or more computers to collectively perform acts comprising:
receiving, from a web browser, a first access request associated with a first domain, the first access request associated with an access token, the access token having a confirmation claim that includes a map of key-value pairs that indicate respective domains authorized to use the access token for automatic authentication;
receiving, from the web browser, a second access request associated with a second domain, the second access request associated with the access token;
determining that a public key of the second domain is not included in the confirmation of the access token;
based on determining that the public key of the second domain is not included in the confirmation of the access token, redirecting the second access request to the web browser to cause the web browser to request, from the first domain, a registration of the second domain with the access token, wherein the request includes the public key of the second domain and data identifying the second domain;
receiving, from the web browser, the request for registration of the second domain with the access token;
registering the second domain as a new domain in the access token by adding a new key-value pair as a confirmation claim that includes the second domain and the public key of the second domain to the map of key-value pairs; and
granting the second access request based at least in part on the new key-value pair and new domain in the access token.

2. The one or more computer-readable storage media of claim 1, wherein the access token is a JSON Web Token (JWT) with the confirmation claim.

3. The one or more computer-readable storage media of claim 1, wherein the map of key-value pairs includes domains that are authorized to use the access token.

4. The one or more computer-readable storage media of claim 1, wherein a nonce token is used to sign the first access request and the second access request.

5. The one or more computer-readable storage media of claim 4 further comprising:
receiving the access token and the nonce token from the first access request; and
using an additional public key from the access token to validate the nonce token.

6. The one or more computer-readable storage media of claim 4, wherein the nonce token is signed using a private key from the web browser.

7. The one or more computer-readable storage media of claim 1, wherein the access token includes an anonymous token or an identification token.

8. The one or more computer-readable storage media of claim 7, wherein the new key-value pair is added to an additional confirmation claim of the anonymous token.

9. The one or more computer-readable storage media of claim 7, wherein the anonymous token or the identification token are returned in cookies to the web browser.

10. A computer system, comprising:
one or more processors; and
a memory having instructions stored therein, the instructions, when executed by the one or more processors, cause the one or more processors to perform acts comprising:
receive, from a web browser, a first access request associated with a first domain, the first access request associated with an access token, the access token having a confirmation claim that includes a map of key-value pairs that indicate respective domains authorized to use the access token for automatic authentication;

receive, from the web browser, a second access request associated with a second domain, the second access request associated with the access token;

determine that a public key of the second domain is not included in the confirmation of the access token;

based on determining that the public key of the second domain is not included in the confirmation of the access token, redirect the second access request to the web browser to cause the web browser to request, from the first domain, a registration of the second domain with the access token, wherein the request includes the public key of the second domain and data identifying the second domain;

receive, from the web browser, the request for registration of the second domain with the access token;

register the second domain as a new domain in the access token by adding a new key-value pair as a confirmation claim that includes the second domain and the public key of the second domain to the map of key-value pairs; and grant the second access request based at least in part on the registration of the second domain as the new domain.

11. The computer system of claim 10, wherein the access token is a JSON Web Token (JWT) with the confirmation claim.

12. The computer system of claim 10, wherein the map of key-value pairs includes domains that are authorized to use the access token.

13. The computer system of claim 10, wherein the first domain generates a nonce token that is used to sign the first access request.

14. The computer system of claim 13, wherein one or more servers receive the access token and the nonce token from the first access request and uses an additional public key from the access token to validate the nonce token.

15. The computer system of claim 13, wherein the nonce token is signed using a private key from the web browser.

16. The computer system of claim 10, wherein the access token includes an anonymous token or an identification token.

17. The computer system of claim 16, wherein a new key-value pair is added to an additional confirmation claim of the anonymous token or the identification token.

18. A computer-implemented method, comprising:

receiving a first access request associated with a first domain, the first access request associated with an access token and signed with a nonce token, the access token having a confirmation claims that includes a map of key-value pairs that indicate respective domains authorized to use the access token for automatic authentication;

receiving a second access request associated with a second domain and signed with the nonce token, the second access request associated with the access token;

determining that a public key of the second domain is not included in the confirmation of the access token;

based on determining that the public key of the second domain is not included in the confirmation of the access token, redirecting the second access request to cause a registration request to be sent, from the first domain, for a registration of the second domain with the access token, wherein the request includes the public key of the second domain and data identifying the second domain;

receiving, from the web browser, the request for registration of the second domain with the access token;

registering the second domain as a new domain in the access token by adding a new key-value pair as a confirmation claim that includes the second domain and the public key of the second domain to the map of key-value pairs; and granting the second access request based at least in part on the new key-value pair and new domain in the access token.

19. The computer-implemented method of claim 18, wherein the access token is a JSON Web Token (JWT) with the confirmation claim.

20. The computer-implemented method of claim 18, wherein the map of key-value pairs includes domains that are authorized to use the access token.

* * * * *